United States Patent
Wei et al.

(10) Patent No.: US 12,047,989 B2
(45) Date of Patent: Jul. 23, 2024

(54) FEEDBACK FOR TYPE II CHANNEL STATE INFORMATION

(71) Applicant: QUALCOMM Incorporated, San Diego, CA (US)

(72) Inventors: Chao Wei, Beijing (CN); Chenxi Hao, Beijing (CN); Liangming Wu, Beijing (CN); Qiaoyu Li, Beijing (CN); Min Huang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 17/309,580

(22) PCT Filed: Jan. 9, 2020

(86) PCT No.: PCT/CN2020/071081
§ 371 (c)(1),
(2) Date: Jun. 7, 2021

(87) PCT Pub. No.: WO2020/143699
PCT Pub. Date: Jul. 16, 2020

(65) Prior Publication Data
US 2022/0039107 A1    Feb. 3, 2022

(30) Foreign Application Priority Data

Jan. 10, 2019    (WO) ................ PCT/CN2019/071099

(51) Int. Cl.
*H04W 72/542* (2023.01)
*H04B 7/0417* (2017.01)
(Continued)

(52) U.S. Cl.
CPC ........ *H04W 72/542* (2023.01); *H04B 7/0417* (2013.01); *H04B 7/0486* (2013.01); *H04W 72/21* (2023.01)

(58) Field of Classification Search
None
See application file for complete search history.

(56) References Cited

U.S. PATENT DOCUMENTS

| | | | |
|---|---|---|---|
| 11,063,649 B2 * | 7/2021 | Zhang | H04W 24/08 |
| 2017/0302353 A1 | 10/2017 | Rahman et al. | |

(Continued)

FOREIGN PATENT DOCUMENTS

| | | |
|---|---|---|
| CN | 109075849 A | 12/2018 |
| TW | I602403 B | 10/2017 |

(Continued)

OTHER PUBLICATIONS

Ericsson: "On CSI Enhancements for MU-MIMO," R1-1905519, 3GPP TSG RAN WG1 Meeting RAN1 #96-bis, Apr. 12, 2019 (Apr. 12, 2019), pp. 1-13, pp. 1, 6-9.

(Continued)

*Primary Examiner* — Anh Vu H Ly
(74) *Attorney, Agent, or Firm* — Harrity & Harrity, LLP

(57) ABSTRACT

Various aspects of the present disclosure generally relate to wireless communication. In some aspects, a user equipment may perform channel state information (CSI) measurements on one or more reference signal transmissions from a base station; determine, based at least in part on the CSI measurements, a set of non-zero linear combination complex coefficients for weighting and co-phasing for a linear combination of a plurality of frequency domain basis vectors and a plurality of spatial domain basis vectors; and transmit a CSI feedback, wherein a first part of the CSI feedback includes at least an indication of a number of the set of non-zero linear combination complex coefficients with regard to all layers of a communication link between the UE and the base station. Numerous other aspects are provided.

27 Claims, 5 Drawing Sheets

(51) Int. Cl.
*H04B 7/0456* (2017.01)
*H04W 72/21* (2023.01)

(56) References Cited

U.S. PATENT DOCUMENTS

| | | | |
|---|---|---|---|
| 2018/0123653 A1* | 5/2018 | Wang | H04L 67/12 |
| 2018/0145737 A1 | 5/2018 | Rahman et al. | |
| 2018/0278315 A1 | 9/2018 | Wu et al. | |
| 2019/0045460 A1* | 2/2019 | Muruganathan | H04B 7/0617 |
| 2019/0280750 A1* | 9/2019 | Rahman | H04L 25/03923 |
| 2020/0028555 A1* | 1/2020 | Rahman | H04L 27/2634 |
| 2020/0162142 A1* | 5/2020 | Rahman | H04B 7/0639 |
| 2021/0242914 A1* | 8/2021 | Park | H04B 7/0486 |
| 2021/0266053 A1* | 8/2021 | Grossmann | H04B 7/0456 |
| 2022/0385338 A1* | 12/2022 | Rahman | H04L 5/0057 |

FOREIGN PATENT DOCUMENTS

| | | |
|---|---|---|
| WO | 2018111007 A1 | 6/2018 |
| WO | 2018223351 A1 | 12/2018 |
| WO | 2019209088 A1 | 10/2019 |

OTHER PUBLICATIONS

International Search Report and Written Opinion—PCT/CN2019/071099—ISA/EPO—Oct. 9, 2020.
International Search Report and Written Opinion—PCT/CN2020/071081—ISA/EPO—Apr. 8, 2020.
Samsung: "Outcome of Offline Session for CSI Enhancement for MU-MIMO Support", 3GPP TSG RAN WG1 Meeting #95, R1-1814201, Nov. 12, 2018-Nov. 16, 2018, Nov. 16, 2018 (Nov. 16, 2018), 3 Pages, the whole document, part 2.2.
Samsung: "Summary of CSI Enhancement for MU-MIMO Support", 3GPP TSG RAN WG1 Meeting #95, R1-1813002, Nov. 12, 2018-Nov. 16, 2018, Nov. 16, 2018 (Nov. 16, 2018), 9 Pages, Section 2.1, tJ1e Whole Document.
ZTE: "CSI Enhancement for MU-MIMO Support," R1-1903343, 3GPP TSG RAN WG1 Meeting #96, Mar. 1, 2019 (Mar. 1, 2019), 16 pages, pp. 2-11.
Intel Corporation: "Discussion on Type II CSI Compression", 3GPP TSG RAN WG1 #95, R1-1813871 CSI Enhancements_R2, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018, XP051555778, 10 Pages, Section 2.2, pp. 2-6, Figures 1, 2, 5.
Supplementary European Search Report—EP20739117—Search Authority—The Hague—Aug. 23, 2022.
Taiwan Search Report—TW109100868—TIPO—Aug. 30, 2023.

* cited by examiner

FEEDBACK FOR TYPE II CHANNEL STATE INFORMATION

CROSS-REFERENCE TO RELATED APPLICATIONS

This application is a 371 national stage of Patent Cooperation Treaty (PCT) Application No. PCT/CN2020/071081 filed on Jan. 9, 2020, entitled "FEEDBACK FOR TYPE II CHANNEL STATE INFORMATION," which claims priority to Patent Cooperation Treaty (PCT) Application No. PCT/CN2019/071099, filed on Jan. 10, 2019, entitled "FEEDBACK FOR TYPE II CHANNEL STATE INFORMATION," which are hereby expressly incorporated by reference herein.

FIELD OF THE DISCLOSURE

Aspects of the present disclosure generally relate to wireless communication, and more particularly to techniques and apparatuses for feedback for type II channel state information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include performing channel state information (CSI) measurements on one or more reference signal transmissions from a base station; determining, based at least in part on the CSI measurements, a set of non-zero linear combination complex coefficients for weighting and co-phasing for a linear combination of a plurality of frequency domain basis vectors and a plurality of spatial domain basis vectors; and transmitting a CSI feedback, wherein a first part of the CSI feedback includes at least an indication of a number of the set of non-zero linear combination complex coefficients with regard to all layers of a communication link between the UE and the base station.

In some aspects, a UE for wireless communication may include memory and one or more processors operatively coupled to the memory. The memory and the one or more processors may be configured to perform CSI measurements on one or more reference signal transmissions from a base station; determine, based at least in part on the CSI measurements, a set of non-zero linear combination complex coefficients for weighting and co-phasing for a linear combination of a plurality of frequency domain basis vectors and a plurality of spatial domain basis vectors; and transmit a CSI feedback, wherein a first part of the CSI feedback includes at least an indication of a number of the set of non-zero linear combination complex coefficients with regard to all layers of a communication link between the UE and the base station.

In some aspects, a non-transitory computer-readable medium may store one or more instructions for wireless communication. The one or more instructions, when executed by one or more processors of a UE, may cause the one or more processors to perform CSI measurements on one or more reference signal transmissions from a base station; determine, based at least in part on the CSI measurements, a set of non-zero linear combination complex coefficients for weighting and co-phasing for a linear combination of a plurality of frequency domain basis vectors and a plurality of spatial domain basis vectors; and transmit a CSI feedback, wherein a first part of the CSI feedback includes at least an indication of a number of the set of non-zero linear combination complex coefficients with regard to all layers of a communication link between the UE and the base station.

In some aspects, an apparatus for wireless communication may include means for performing CSI measurements on one or more reference signal transmissions from a base station; means for determining, based at least in part on the CSI measurements, a set of non-zero linear combination complex coefficients for weighting and co-phasing for a linear combination of a plurality of frequency domain basis vectors and a plurality of spatial domain basis vectors; and means for transmitting a CSI feedback, wherein a first part of the CSI feedback includes at least an indication of a number of the set of non-zero linear combination complex coefficients with regard to all layers of a communication link between the apparatus and the base station.

In some aspects, a method of wireless communication, performed by a base station, may include receiving CSI feedback for a communication link with a UE, wherein a first part of the CSI feedback includes at least an indication of a number of a set of non-zero linear combination complex coefficients with regard to all layers of the communication link, wherein the set of non-zero linear combination complex coefficients is for weighting and co-phasing for a linear combination of a plurality of frequency domain basis vectors and a plurality of spatial domain basis vectors; and performing a communication on the communication link between the UE and the base station based at least in part on the CSI feedback.

In some aspects, a base station for wireless communication may include memory and one or more processors operatively coupled to the memory. The memory and the one or more processors may be configured to receive CSI feedback for a communication link with a UE, wherein a first part of the CSI feedback includes at least an indication of a number of a set of non-zero linear combination complex coefficients with regard to all layers of the communication link, wherein the set of non-zero linear combination complex coefficients is for weighting and co-phasing for a linear combination of a plurality of frequency domain basis vectors and a plurality of spatial domain basis vectors; and perform a communication on the communication link between the UE and the base station based at least in part on the CSI feedback.

In some aspects, a non-transitory computer-readable medium may store one or more instructions for wireless communication. The one or more instructions, when executed by one or more processors of a base station, may cause the one or more processors to receive CSI feedback for a communication link with a UE, wherein a first part of the CSI feedback includes at least an indication of a number of a set of non-zero linear combination complex coefficients with regard to all layers of the communication link, wherein the set of non-zero linear combination complex coefficients is for weighting and co-phasing for a linear combination of a plurality of frequency domain basis vectors and a plurality of spatial domain basis vectors; and perform a communication on the communication link between the UE and the base station based at least in part on the CSI feedback.

In some aspects, an apparatus for wireless communication may include means for receiving CSI feedback for a communication link with a UE, wherein a first part of the CSI feedback includes at least an indication of a number of a set of non-zero linear combination complex coefficients with regard to all layers of the communication link, wherein the set of non-zero linear combination complex coefficients is for weighting and co-phasing for a linear combination of a plurality of frequency domain basis vectors and a plurality of spatial domain basis vectors; and means for performing a communication on the communication link between the UE and the base station based at least in part on the CSI feedback.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
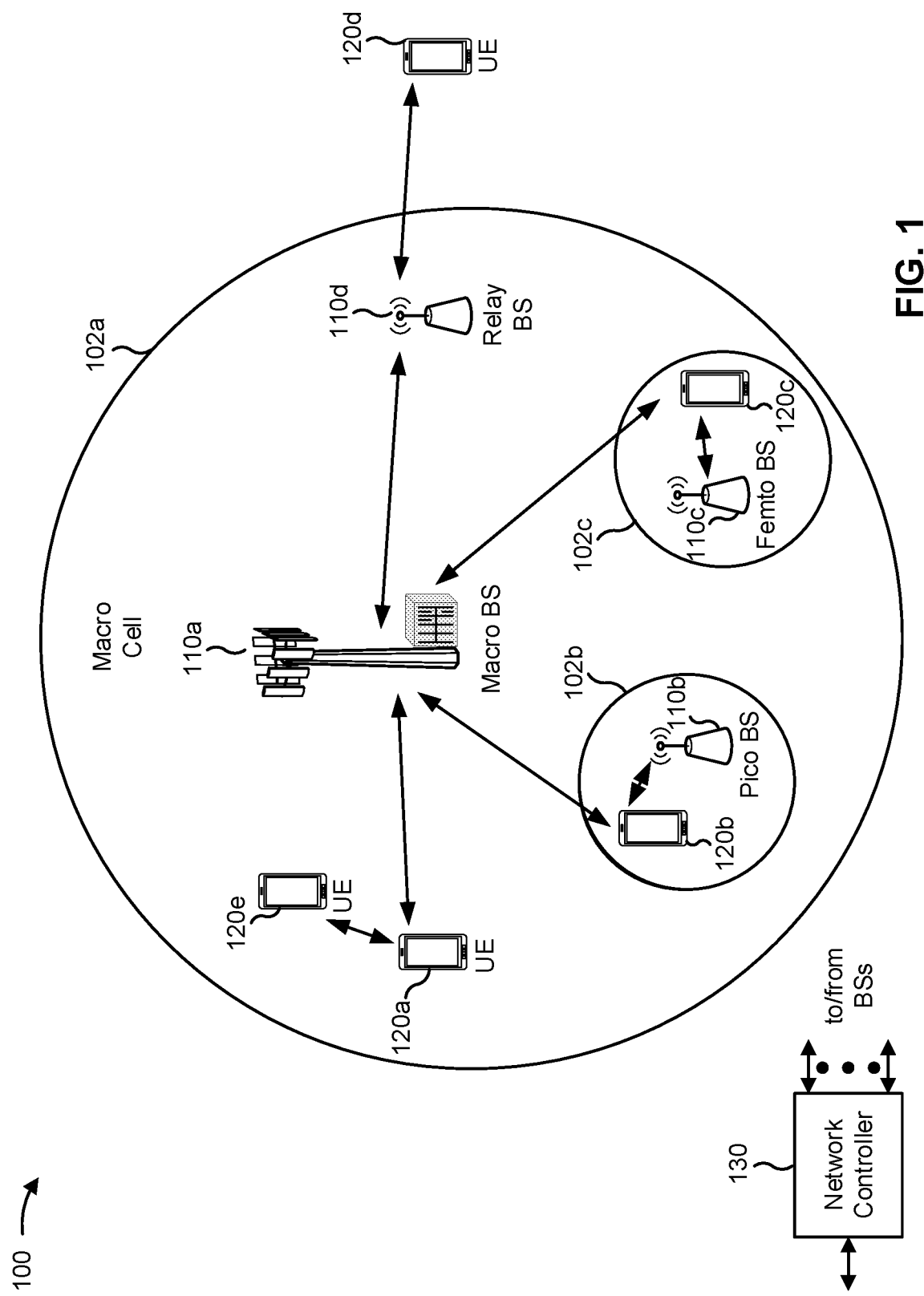
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
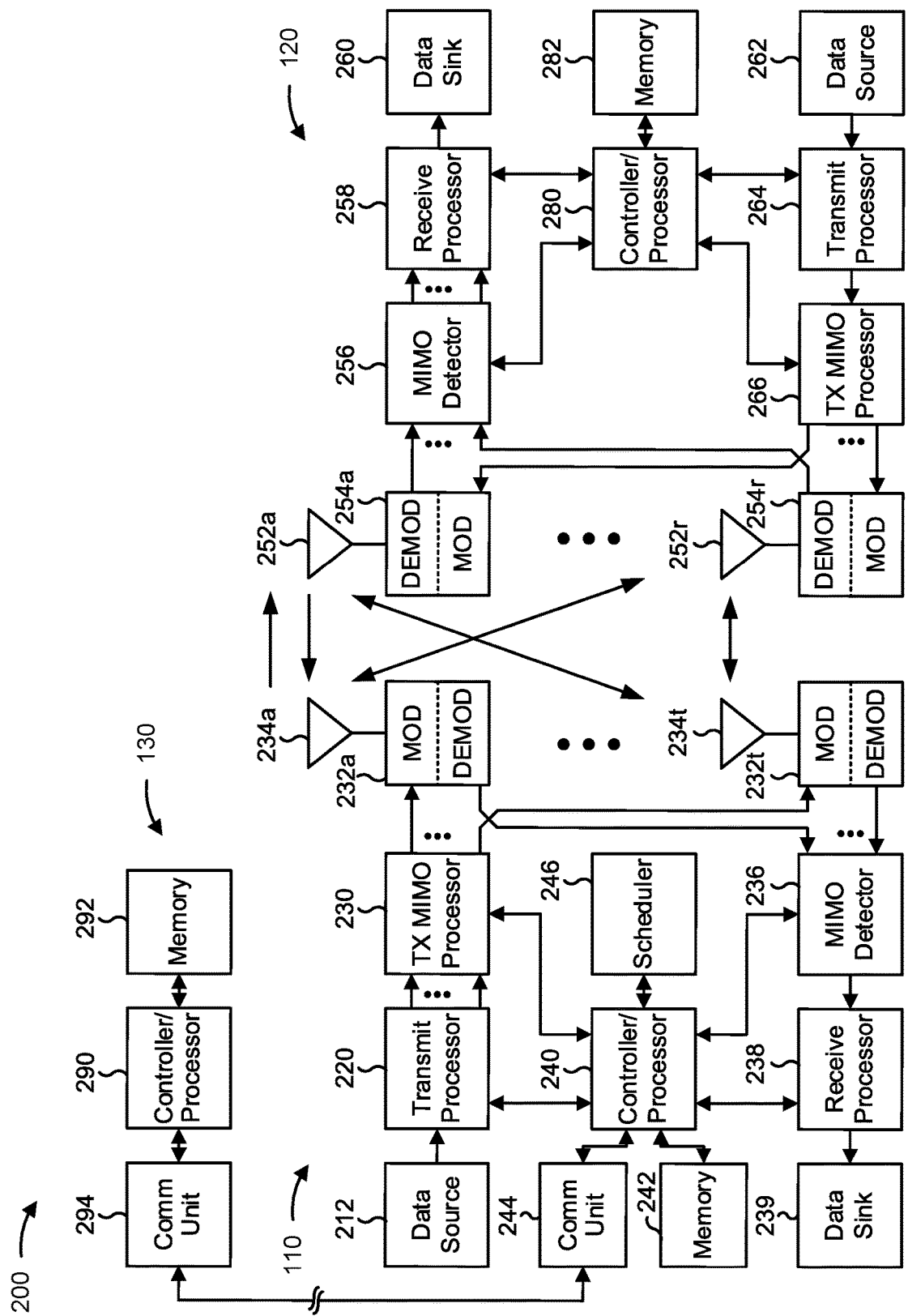
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with Type II feedback for channel state information, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for performing CSI measurements on one or more reference signal transmissions from a base station; means for determining, based at least in part on the CSI measurements, a set of non-zero linear combination complex coefficients for weighting and co-phasing for a linear combination of a plurality of frequency domain basis vectors and a plurality of spatial domain basis vectors; means for transmitting a CSI feedback, wherein a first part of the CSI feedback includes at least an indication of a number of the set of non-zero linear combination complex coefficients with regard to all layers of a communication link between the UE and the base station; and/or the like. In some aspects, such means may include one or more components of UE 120 described in connection with FIG. 2.

In some aspects, base station 110 may include means for receiving CSI feedback for a communication link with a UE, wherein a first part of the CSI feedback includes at least an indication of a number of a set of non-zero linear combination complex coefficients with regard to all layers of the communication link, wherein the set of non-zero linear combination complex coefficients is for weighting and co-phasing for a linear combination of a plurality of frequency domain basis vectors and a plurality of spatial domain basis vectors; means for performing a communication on the communication link based at least in part on the CSI feedback; and/or the like. In some aspects, such means may include one or more components of base station 110 described in connection with FIG. 2.

As indicated above, FIG. 2 is provided merely as an example. Other examples may differ from what is described with regard to FIG. 2.

A BS (e.g., BS 110) may transmit a plurality of beams. For example, the BS may generate the beams using an antenna panel that generates beams at a spatial and/or phase displacement from each other. The BS and a corresponding UE may select a set of beams that are to be used for communication between the BS and the UE. For example, the set of beams transmitted from the BS to the UE may be referred to herein as a communication link. The communication link between the BS and the UE may propagate in a medium and/or through various geometric paths, which are collectively referred to herein as a channel between the BS and the UE.

In some aspects, the UE may select a set of beams for communication with the BS. For example, the UE may select the set of beams based at least in part on the set of beams being associated with favorable characteristics (e.g., a satisfactory receive power, a satisfactory signal to interference plus noise (SINR) value, and/or the like). The UE may generate a codeword using a codebook and based at least in part on performing channel estimation of the channel between the UE and the BS. The codeword may indicate the set of beams and parameters to be used.

One such codebook is the Type II codebook, prescribed in 5G/NR. The Type II codebook may use a two-stage procedure to generate the codeword: a first stage wherein the set of beams is selected for a wideband of the communication link (e.g., sometimes referred to herein as W1), and a second stage wherein linear combination is performed, for a set of subbands, using the set of beams for each set of subbands. The codeword may be based at least in part on the linear combination, and may indicate the set of beams and/or respective amplitudes, phase coefficients, and/or the like. Thus, the UE may provide an indication of channel state at the UE and may request the set of beams to be used for the UE. The Type II codebook may provide more precise specification of the channel state than a Type I codebook, which may provide a predefined codeword-based approach to specifying selected beams. Thus, the Type II codebook may be referred to as a high resolution codebook in comparison to the Type I codebook. The Type II codebook may improve multi-user multiple input multiple output (MU-MIMO) performance on the communication link.

For one type of Type II codebook (e.g., the codebook specified in Release 15 of the 3GPP standard for 5G/NR), the precoder of the codebook is based at least in part on a linear combination of discrete Fourier transform (DFT) beams. The linear combination codebook may define the precoder W as $W=W_1W_2$, wherein the spatial domain compression matrix $$W_1 = \begin{bmatrix} v_0 v_1 \ldots v_{L-1} & 0 \\ 0 & v_0 v_1 \ldots v_{L-1} \end{bmatrix},$$

wherein $\{v_i\}_{i=0}^{L-1}$ are L spatial domain basis vectors of dimension $N_1N_2 \times 1$ (mapped to the two polarizations, so 2 L in total), $P=2N_1N_2$ indicates a number of dimensions (sometimes represented as D), and the combination coefficient matrix $W_2$ is composed of K=2 Lv linear combination coefficients, where v indicates a total number of layers. Each column in $W_2$ indicates the linear combination of complex coefficients (i.e., amplitude and phase) for one layer, wherein the amplitude coefficient is given by $\{p_l^{(1)} p_l^{(2)}\}_{i=0}^{2L-1}$ for l=0, ..., v-1 and $p_l^{(1)}$ and $p_l^{(2)}$ are the wideband and subband coefficients, respectively. The phase coefficient is given by $\{c_{l,i}\}_{i=0}^{2L-1}$ for l=0, ..., v-1 and $c_i$ is one of the 8 phase shift keying (8PSK) or the quadrature phase shift keying (QPSK) constellation points.

The UE may report the above values and/or other values associated with channel estimation using channel state information (CSI) feedback. CSI feedback for the Type II codebook may include two parts: a first part, sometimes referred to as CSI Part I, and a second part, sometimes referred to as CSI Part II. In some cases, the first part may have a smaller payload than the second part, and/or may have a fixed payload. For example, the first part may have a payload size of less than approximately 50 bits, whereas the second part may have a variable payload size that may be dependent on the first part. In some cases, the second part may have a payload size of approximately 100 bits to 600 bits, although other values may be used.

In some cases, the first part may identify one or more of: a rank indicator (RI) (e.g., 1 bit to indicate one layer v=1 or two layers v=2 when the configured maximum rank is 2); wideband and subband differential channel quality indicators (CQI), for which a total payload size may be dependent on the number of subbands (e.g., approximately 4+18×2=40 bits for 19 subbands); an indication of the number of non-zero wideband amplitude coefficients $Q_l$ for each layer; and/or the like. In some cases, the second part may identify one or more of: wideband and/or subband precoding matrix indicators (PMIs) including a spatial basis vector selection indication; wideband and subband amplitude coefficients; subband phase coefficients; and/or the like.

In some cases, the Type II CSI feedback may use a compressed Type II precoder. This may reduce overhead of Type II CSI feedback. The compressed precoder may exploit the sparsity of the spatial domain and/or the frequency domain. For example, an example of a compressed Type II precoder W is given by $W=W_1 \widetilde{W} W_f^H$ wherein the precoder matrix W has $P=2N_1N_2$ rows (representing the spatial domain and the number of ports) and $N_3$ columns (wherein $N_3$ is a frequency-domain compression unit of resource blocks or reporting subbands). The $W_1$ matrix, described above, is the spatial basis consisting of L beams per polarization group (hence a total of 2 L beams). The $\widetilde{W}_2$ matrix indicates all of the required linear combination complex coefficients (amplitude and co-phasing), similarly to what is described above. The $W_f$ matrix is composed of the basis vectors used to perform compression in frequency domain, $W_f=[f_0 f_1 \ldots f_{m-1}]$, where $\{f_m\}_{m=0}^{M-1}$ are M size-$N_3 \times 1$ orthogonal DFT vectors for each spatial basis i=0, ..., 2 L-1. The above Type II CSI feedback may be referred to in some cases as enhanced or modified Type II CSI feedback (e.g., enhanced relative to the approach that does not use basis vectors in the spatial and frequency domains to compress feedback size).

The CSI feedback for this modified Type II CSI feedback may include a spatial domain basis vector selection that is similar to the approach described in connection with the legacy Type II CSI feedback configuration. The CSI feedback may further include a frequency-domain (FD) basis subset selection (wherein M out of a total $N_3$ basis vectors are selected). In some cases, common FD basis vectors for all the 2 L spatial beams may be used, which is referred to herein as Alternative 1. In these cases, M basis vectors are dynamically selected and reported. The value of M may be configured by the network or reported by the UE. In other cases, independent FD basis vectors may be used for each spatial domain basis vector, with potentially different numbers and/or selections of FD basis vectors for each spatial domain basis vector. The total number of FD basis vectors across all the 2 L spatial beams may be configured.

The modified Type II CSI feedback may further include the FD coefficients (e.g., amplitude and phase) in $\widetilde{W}_2$. For Alternative 1, which is the common FD basis vector subset selection, the modified Type II CSI feedback may report only a subset $K_0 < K = 2$ LM of the coefficients. For Alternative 2, which is the independent basis subset selection, the modified Type II CSI feedback may report $K = \Sigma_{i=0}^{2L-1} M_i$ amplitude and phase coefficients, wherein $M_i$ is the number of FD basis vectors associated with one spatial beam.

A variety of quantization and reporting options may be used, two examples of which are provided below. As a first example, for each of the K or $K_0$ FD coefficients, the modified Type II CSI feedback may use 3-bit amplitude and QPSK or 8PSK phase. As a second example, the modified Type II CSI feedback may report a 3-bit wideband amplitude for each beam or spatial domain basis vector, a 2-bit or 3-bit differential amplitude for each FD coefficient, and a QPSK or 8PSK phase.

It may be desirable to reduce the overhead associated with the modified Type II CSI feedback. One way to achieve this is to report the number of non-zero FD complex coefficients of $\widetilde{W}_2$ in the first part of the CSI feedback. This may be particularly beneficial when a larger number of complex coefficients (i.e., K=2 LM) is configured. Another way to achieve this may be to provide an indication of the number of beams or spatial domain basis vectors with at least one non-zero FD complex coefficient. However, the number of non-zero FD complex coefficients can be different in each layer of the communication link, and the number of beams with at least one non-zero FD complex coefficient can be layer-specific. Because of these concerns, it may be undesirable to report these values individually for these layers (referred to as per-layer reporting), since CSI Part 1 may be increased to an undesired or unsustainable level. As an example, for rank 4, K=32, and L=4, per layer reporting may require (5+3)*4=32 bits (i.e., 5 bits for the number of non-zero FD complex coefficients and 3 bits for the number of beams with non-zero FD coefficients), which represents a 50% increase to the size of CSI Part 1.

Some techniques and apparatuses described herein provide joint reporting of a total number of non-zero FD complex coefficients (e.g., $K_{total}$) across all layers of the communication link. Similarly, if the number of beams with non-zero FD complex coefficients (e.g., $Q_{total}$) is to be reported, then the number of beams may be reported jointly across all layers. This may reduce CSI Part 1 overhead relative to per-layer reporting. More particularly, for rank 4, K=32, and L=4, the joint reporting may use a total of 5+7=12 bits (i.e., $\log_2 (4 \times 8)=5$ bits for $Q_{total}$ and $\log_2 (4 \times 32)=7$ bits for $K_{total}$). In this example, 32-12=20 bits are saved compared to per-layer reporting.

Furthermore, some techniques and apparatuses described herein provide constrained FD basis vector subset selection and reporting in CSI Part 2 (e.g., based at least in part on an adjacency-based approach, described in more detail elsewhere herein), which further reduces CSI feedback overhead. In some aspects, techniques and apparatuses described herein provide per-layer reporting of the number of non-zero FD complex coefficients in CSI Part 2 based at least in part on the rank that is reported in CSI Part 1. When the rank is 1 (e.g., a rank indicator of 0), positions of the non-zero FD complex coefficients for all layers and values of the coefficients may be reported for all layers. When the rank is greater than 1 (e.g., a rank indicator of 1 or more), a number of non-zero FD coefficients for a subset of layers may be reported, thereby further reducing overhead. In the above cases, when the beam selection is to be reported, non-zero beam selections may be reported for all layers (e.g., as opposed to individually), which even further reduces overhead. In this way, signaling resources of the communication link are conserved and communication performance between the UE and the BS is improved based at least in part on increased efficiency in signaling the Type II CSI feedback.

By reducing signaling overhead of the Type II CSI feedback, efficiency of the communication link may be improved and radio resources of the UE and the BS may be conserved. This, in turn, may allow for the signaling of more robust CSI feedback (e.g., with higher specificity about the coefficients to be used for the beams) than would otherwise be practical with less efficient signaling overhead.

Figure 3:
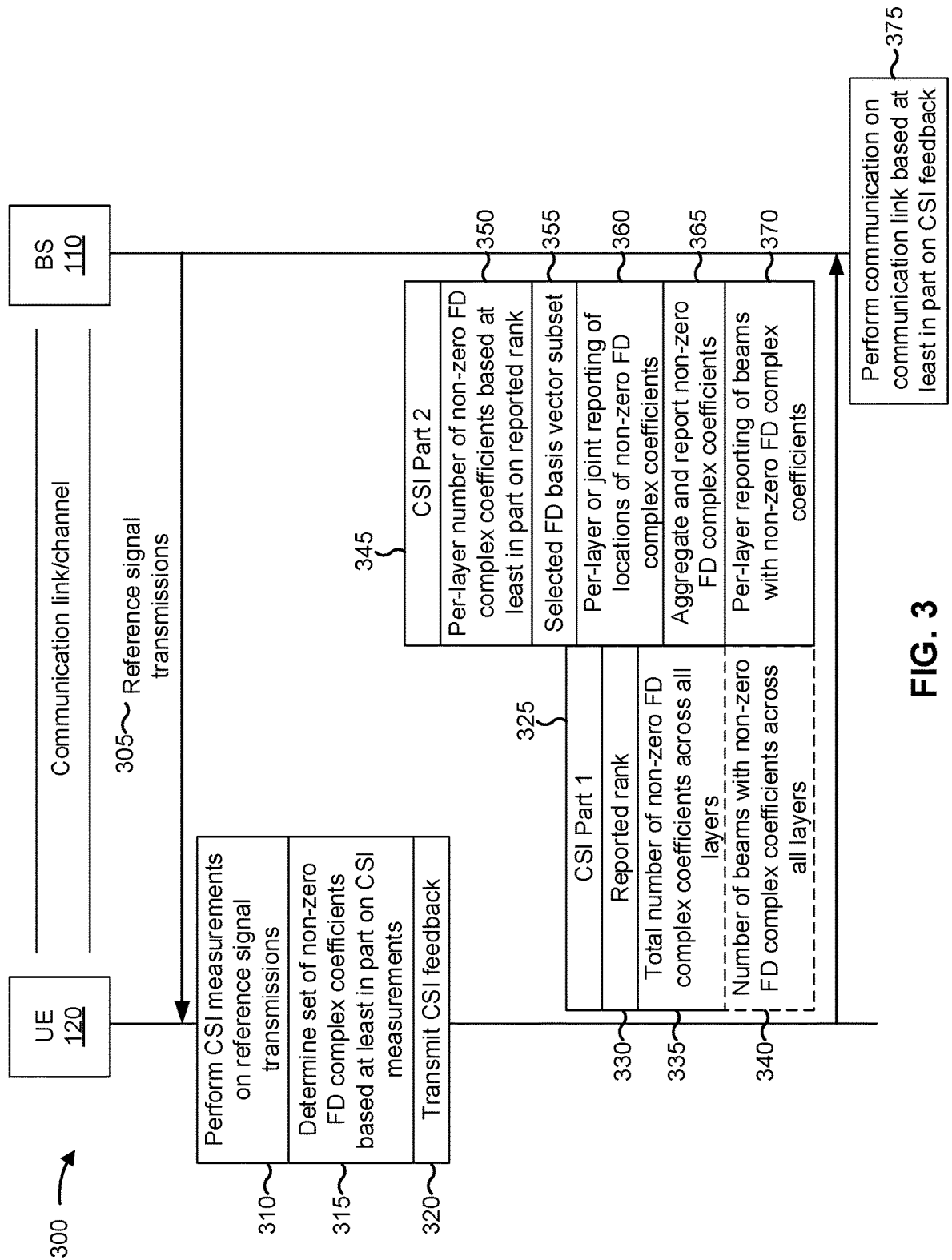
FIG. 3 is a diagram illustrating an example of modified Type II CSI feedback, in accordance with various aspects of the present disclosure.

FIG. 3 is a diagram illustrating an example 300 of modified Type II CSI feedback in accordance with various aspects of the present disclosure. As shown, example 300 includes a UE 120 and a BS 110 that are associated with a communication link. As further shown, the communication link may be associated with a channel. For example, the communication link may be referred to as the channel, or may propagate via the channel.

As shown in FIG. 3, and by reference number 305, the BS 110 may transmit reference signal transmissions to the UE 120. The reference signal transmissions may include, for example, a CSI reference signal, a demodulation reference signal, and/or the like. As shown by reference number 310, the UE 120 may perform CSI measurements on the reference signal transmissions to determine CSI feedback, as described below.

As shown by reference number 315, the UE 120 may determine a set of non-zero FD complex coefficients based at least in part on the CSI measurements. For example, the UE 120 may determine CSI feedback based at least in part on the CSI measurements. A more detailed description of the determination of the CSI feedback and the corresponding reporting of the CSI feedback is provided in connection with the description of the CSI feedback below. A non-zero FD complex coefficient is also referred to as a non-zero linear combination complex coefficient herein.

As shown by reference number 320, the UE may transmit CSI feedback based at least in part on the set of non-zero FD complex coefficients. The CSI feedback is described in more detail in connection with reference numbers 325 through 340 (e.g., the first part of the CSI feedback) and reference numbers 345 through 365 (e.g., the second part of the CSI feedback).

As shown by reference number 330, the first part may identify a reported rank of the communication link. For example, the first part may identify a rank indicator (RI), which may indicate that the communication link is associated with one layer (e.g., v=1), two layers (e.g., v=2), or more layers.

As shown by reference number 335, the first part may identify a number of non-zero FD complex coefficients of the set of non-zero FD complex coefficients. For example, the first part may identify a total number of non-zero FD complex coefficients (e.g., $K_{total}$) across all layers of the communication link. In some aspects, $K_{total}$ may be in a range of 1 to $K^*v_{max}$ (inclusive), wherein $v_{max}$ indicates a maximum number of allowed layers and K is a maximum number of the non-zero FD complex coefficients for one layer. K may be defined as the minimum of ($K_c$, 2 LM), wherein $K_c$ is a configured value (e.g., configured by a higher layer of UE 120 or BS 110) and M is the number of FD basis vectors. By using $v_{max}$ instead of the reported rank, a fixed payload size or bitwidth (e.g., independent of the RI) for CSI Part 1 is ensured. In some aspects, the bitwidth for reporting $K_{total}$ may be fixed (e.g., based at least in part on the configured maximum rank). In some aspects, the bitwidth of $K_{total}$ may be based at least in part on the reported rank and may be padded to a fixed width.

As shown by reference number 340, the first part may identify a number of beams or spatial domain basis vectors with non-zero FD complex coefficients across all layers of the communication link. For example, the first part may identify $Q_{total}$, wherein $Q_{total}$ is between 1 and $2 Lv_{max}$ (inclusive). The dotted line around the block indicated by reference number 340 indicates that this operation is optional. In some aspects, the UE may selectively provide the information identifying the number of beams with non-zero FD complex coefficients based at least in part on a size of $Q_{total}$. For example, $Q_{total}$ may only reduce overhead when $Q_{total}$ is lower than a threshold, as described in more detail elsewhere herein. Therefore, the UE 120 may provide information identifying $Q_{total}$ only when $Q_{total}$ is lower than the threshold.

As shown by reference number 350, the second part may identify a per-layer number of non-zero FD complex coefficients based at least in part on the reported rank. In some aspects, information indicating the per-layer number of non-zero FD complex coefficients may relate to multiple, different layers. For example, if the reported rank is larger than one (e.g., v>1), then the number of the non-zero FD coefficients for the first v−1 layers may be reported. For example, the UE 120 may report the number of non-zero FD complex coefficients as $K_l$, l=0, 1, . . . , v−2 with $1 \le K_l \le K$. Thus, the UE 120 may conserve signaling resources that would be used to report the non-zero FD complex coefficients for the v-th layer, since this value can be determined from $K_{total}$ in CSI Part 1 and the values of the other layers.

As shown by reference number 355, the second part may identify a selected FD basis vector subset. For example, the second part may identify MFD basis vector subset. In some aspects, the UE 120 may select M from the set of all FD basis vectors $N_3$. For example, the UE 120 may perform an unconstrained selection of M. In such a case, the UE 120 may report a combination index with the value range $$0 \le i < \binom{N_3}{M}.$$

In some aspects, the UE 120 may perform a constrained selection of M FD basis vector subset, which conserves processing resources used to select M and enables a reduction in size of CSI Part 2. For example, the UE 120 may select M based at least in part on a set of adjacent or almost-adjacent basis vectors. More particularly, the UE 120 may determine and report a first index $i_1$ from $N_3$ (e.g., $0 \le i_1 < N_3$) as a first basis vector of M. The UE 120 may determine and report a second index for selection of the remaining M−1 basis vectors from a subset of adjacent N' basis vectors, $0 \le i_2 <$ $$\binom{N'}{M-1}$$

where N'<$N_3$ is either configured or predefined (e.g., fixed in the standards) based at least in part on $N_3$ and the subband size of the CSI feedback. The index of the N' basis vectors is given by $mod(i_1+d, N_3)$ for d=0, 1, . . . , N'−1. The constrained selection may have less complexity than the unconstrained selection, particularly for larger values of $N_3$. For example, the FD complex coefficient may be equivalent to the tap coefficient of the channel time domain response for which a very large delay spread for each spatial domain beam may not be common, i.e. unconstrained selection of M.

As shown by reference number 360, the second part may identify a per-layer or joint reporting of locations or positions of non-zero FD complex coefficients. For example, the CSI feedback may identify the positions or selections of the coefficients of $K_{total}$ corresponding to the 2 L spatial domain basis vectors and the MFD basis vectors. In some aspects, the UE 120 may determine and report positions of the non-zero FD complex coefficients for each layer using a 2 LM×v bit bitmap (e.g., 2 LM bits bitmap for each of a total v layers), which may reduce complexity in comparison to determining whether to reduce non-zero FD complex coefficient locations. In some aspects, the UE 120 may determine and report positions of zero-value coefficients or of non-zero coefficients. For example, the UE 120 may determine and jointly report, across all layers, the location of the $K_{total}$ non-zero FD coefficients or the $Kv-K_{total}$ zero-value FD coefficients with $[\log_2 2 LM]$ bits for each coefficient. Thus, the UE 120 may reduce the number of bits required to report the locations or positions to the minimum of $(K_{total}, K_v-K_{total}) \times [\log_2 2 LM]$ bits where $K=\min(K_c, 2 LM)$. Then, based at least in part on the reporting of per-layer $K_l$ in CSI Part 2, the mapping of the position of the non-zero FD coefficients to each layer can be determined.

As an example, the down-selection of the two options (e.g., whether to report the non-zero FD complex coefficients (or the zero-value FD complex coefficients) individually per layer or jointly across all the layers) can be based at least in part on the option associated with the smaller payload. For example, the smaller payload may be identified based at least in part on $K_{total}$ and v for a given L and M. As a more particular example, for L=4, M=4, K=32, v=4:

If $K_{total}$=96, the per-layer reporting of the non-zero FD coefficient reporting option may use 128 bits and the jointly reporting of the zero-value FD coefficient reporting option uses 160 bits, so the per-layer reporting of the non-zero FD coefficient reporting option may be used.

If $K_{total}$=112, the per-layer reporting of the non-zero FD coefficient report option may use 128 bits and the jointly reporting of the zero-value FD coefficient reporting option uses 80 bits, so the jointly reporting of the zero-value FD coefficient reporting option may be used.

As shown by reference number 365, the UE 120 may aggregate and report the set of non-zero FD complex coefficients. For example, the UE 120 may aggregate and report the amplitude and phase coefficients of the non-zero FD complex coefficients of all layers of the communication link according to layer index. This may enable a recipient (e.g., the BS 110) to map the coefficients to each layer based at least in part on the number and position of non-zero FD complex coefficients of each layer and the basis vectors at a reduced CSI feedback size relative to individual reporting of coefficients per layer.

As shown by reference number 370, the second part may identify per-layer reporting of beams or spatial domain basis vectors with non-zero FD complex coefficients. For example, if the total number of spatial beams with non-zero FD complex coefficients across all layers $Q_{total}$ is reported in CSI Part 1, then the indication of the position of the non-zero FD coefficients using the individual (per-layer) reporting technique described above can be performed using a bitmap of, for example, $Q_{total} \times M$ bits. In such a case, CSI Part 2 may further indicate the selection of beams with non-zero FD coefficients for each layer, which may use a total 2 L×v bits bitmap (e.g., 2 L bits bitmap for each of a total v layers). Therefore, there may be overhead reduction only when $Q_{total}$ is not too large. For example, L=4, M=4, v=4, $1 \leq Q_{total} \leq 32$, overhead is reduced only for $Q_{total} < 24$, corresponding to 75% beams with non-zero FD coefficients. Thus, the UE 120 may selectively determine whether $Q_{total}$ is to be reported, and if the per-layer reporting of beams is to be performed as indicated by reference number 370, based at least in part on whether the overhead of CSI Part 2 is reduced by reporting $Q_{total}$.

As shown by reference number 375, the BS 110 (and/or the UE 120) may perform communication on the communication link based at least in part on the CSI feedback. For example, the BS 110 may generate one or more beamforming for the UE 120 using the phase and amplitude FD coefficients, one or more spatial domain basis vectors, one or more frequency domain basis vectors, and/or other information included in the CSI feedback. In this way, the UE 120 and the BS 110 reduce overhead associated with CSI feedback by signaling information identifying at least a number of non-zero FD coefficients across all layers of the communication link between the UE 120 and the BS 110, thereby conserving computing resources.

As indicated above, FIG. 3 is provided as an example. Other examples may differ from what is described with respect to FIG. 3.

Figure 4:
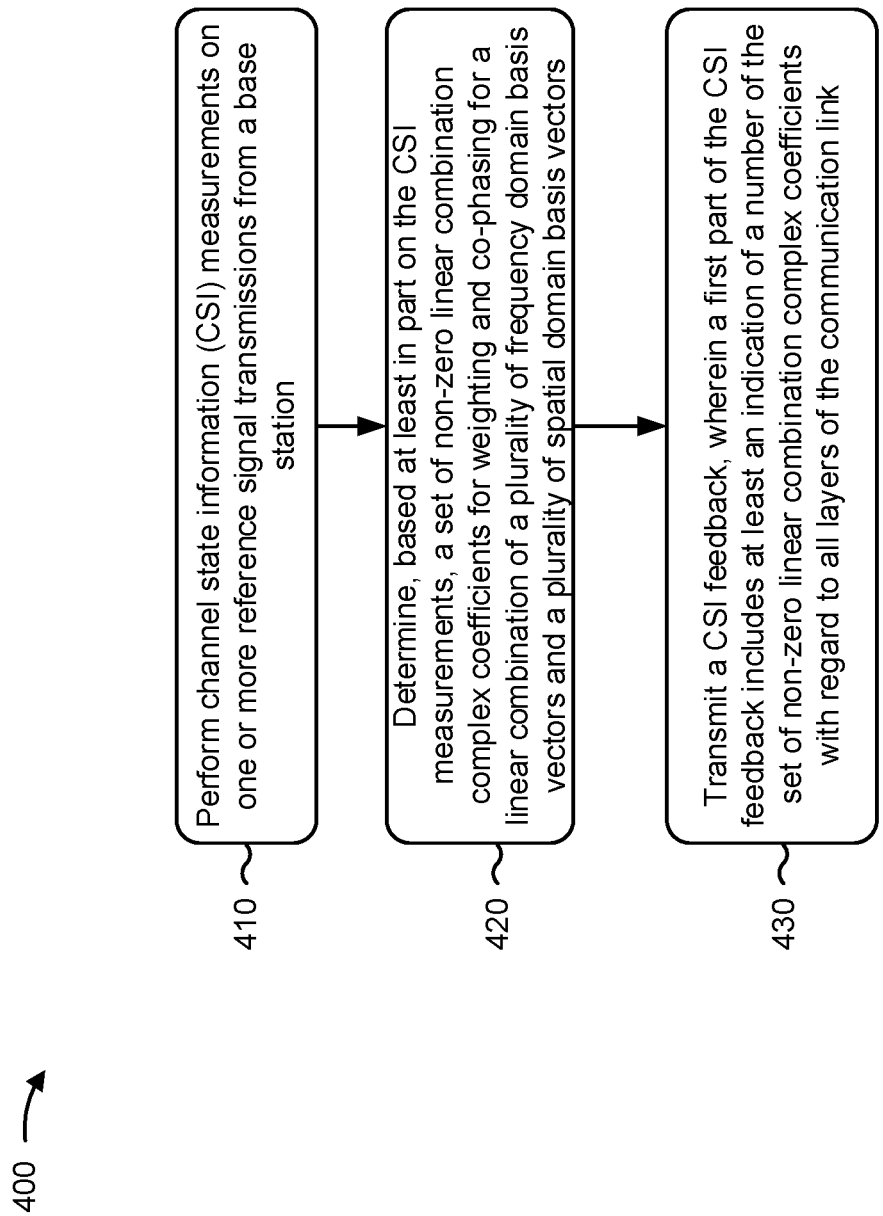
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120) performs CSI feedback identifying at least a number of non-zero FD coefficients across all layers of a communication link.

As shown in FIG. 4, in some aspects, process 400 may include performing channel state information (CSI) measurements on one or more reference signal transmissions from a base station (block 410). For example, the UE (e.g., using antenna 252, DEMOD 254, MIMO detector 256, receive processor 258, controller/processor 280, and/or the like) may perform CSI measurements on one or more reference signal transmissions from a base station (e.g., BS 110), as described elsewhere herein.

As shown in FIG. 4, in some aspects, process 400 may include determining, based at least in part on the CSI measurements, a set of non-zero linear combination complex coefficients for weighting and co-phasing for a linear combination of a plurality of frequency domain basis vectors and a plurality of spatial domain basis vectors (block 420). For example, the UE (e.g., using controller/processor 280 and/or the like) may determine a set of non-zero linear combination complex coefficients. The set of non-zero linear combination complex coefficients may be for weighting and co-phasing for a linear combination of a plurality of frequency domain basis vectors and a plurality of spatial domain basis vectors.

As shown in FIG. 4, in some aspects process 400 may include transmitting a CSI feedback, wherein a first part of the CSI feedback includes at least an indication of a number of the set of non-zero linear combination complex coefficients with regard to all layers of a communication link between the UE and the base station (block 430). For example, the UE (e.g., using controller/processor 280, transmit processor 264, TX MIMO processor 266, MOD 254, antenna 252, and/or the like) may transmit CSI feedback. A first part of the CSI feedback may include at least an indication of a number of non-zero linear combination complex coefficients, of the set of non-zero linear combination complex coefficients, with regard to all layers of the communication link.

Process 400 may include additional aspects, such as any single aspect and/or any combination of aspects described below and/or in connection with one or more other processes described elsewhere herein.

In a first aspect, the indication of the number of the set of non-zero linear combination complex coefficients has a fixed bitwidth based at least in part on a configured maximum number of layers of the communication link.

In a second aspect, alone or in combination with the first aspect, a bitwidth of the indication is independent of a rank indicator of the CSI feedback. In a third aspect, alone or in combination with one or more of the first and second aspects, if a number of layers of the CSI feedback is equal to v and is greater than 1, a second part of the CSI feedback indicates how many non-zero linear combination complex coefficients are included in a set of v minus 1 layers of the communication link. In a fourth aspect, alone or in combination with one or more of the first through third aspects, a second part of the CSI feedback includes an index identifying a selected subset of frequency domain basis vectors from a set of potential frequency domain basis vectors. In a fifth aspect, alone or in combination with one or more of the first through fourth aspects, the index is a combination index with a value between zero and a set of all basis vectors of the frequency domain basis vectors.

In a sixth aspect, alone or in combination with one or more of the first through fifth aspects, a second part of the CSI feedback includes: a first index identifying a particular frequency domain basis vector of a selected subset of frequency domain basis vectors, and a second index identifying remaining frequency domain basis vectors of the selected subset of frequency domain basis vectors. In a seventh aspect, alone or in combination with one or more of the first through sixth aspects, the remaining frequency domain basis vectors are selected from a subset of a set of potential frequency domain basis vectors, and the subset of the set of potential frequency domain basis vectors are adjacent to the particular frequency domain basis vector. In an eighth aspect, alone or in combination with one or more of the first through seventh aspects, a size of the subset of the set of potential frequency domain basis vectors is based at least in part on a subband size of the CSI feedback.

In a ninth aspect, alone or in combination with one or more of the first through eighth aspects, a second part of the CSI feedback identifies positions of the set of non-zero linear combination complex coefficients, or of a set of zero-value linear combination complex coefficients. In a tenth aspect, alone or in combination with one or more of the first through ninth aspects, the positions are identified using a respective bitmap for each layer of the CSI feedback. In an eleventh aspect, alone or in combination with one or more of the first through tenth aspects, the positions of the set of non-zero linear combination complex coefficients, or of the set of zero-value linear combination complex coefficients, are identified by individually reporting the position of each frequency domain complex coefficient of the set of non-zero linear combination complex coefficients or the set of zero-value linear combination complex coefficients.

In a twelfth aspect, alone or in combination with one or more of the first through eleventh aspects, the second part of the CSI feedback identifies the positions based at least in part on a payload size of the CSI feedback when identifying positions of the set of non-zero linear combination complex coefficients in comparison to a payload size of the CSI feedback when identifying positions of the set of zero-value linear combination complex coefficients. In a thirteenth aspect, alone or in combination with one or more of the first through twelfth aspects, the first part of the CSI feedback includes information indicating a number of spatial domain basis vectors, of a set of selected spatial domain basis vectors, that have non-zero linear combination complex coefficients, and the second part of the CSI feedback identifies the positions of the set of non-zero linear combination complex coefficients based at least in part on a bitmap, wherein the bitmap is based at least in part on the number of spatial domain basis vectors that have non-zero linear combination complex coefficients and a number of a set of selected frequency domain basis vectors.

In a fourteenth aspect, alone or in combination with one or more of the first through thirteenth aspects, the second part of the CSI feedback identifies respective subsets of spatial domain basis vectors, of the number of spatial domain basis vectors that have non-zero linear combination complex coefficients, for each layer of the communication link. In a fifteenth aspect, alone or in combination with one or more of the first through fourteenth aspects, a second part of the CSI feedback jointly identifies respective amplitude and phase values of the set of non-zero linear combination complex coefficients for all layers of the communication link.

Although FIG. 4 shows example blocks of process 400, in some aspects process 400 may include additional blocks, fewer blocks, different blocks, or differently arranged blocks than those depicted in FIG. 4. Additionally, or alternatively, two or more of the blocks of process 400 may be performed in parallel.

Figure 5:
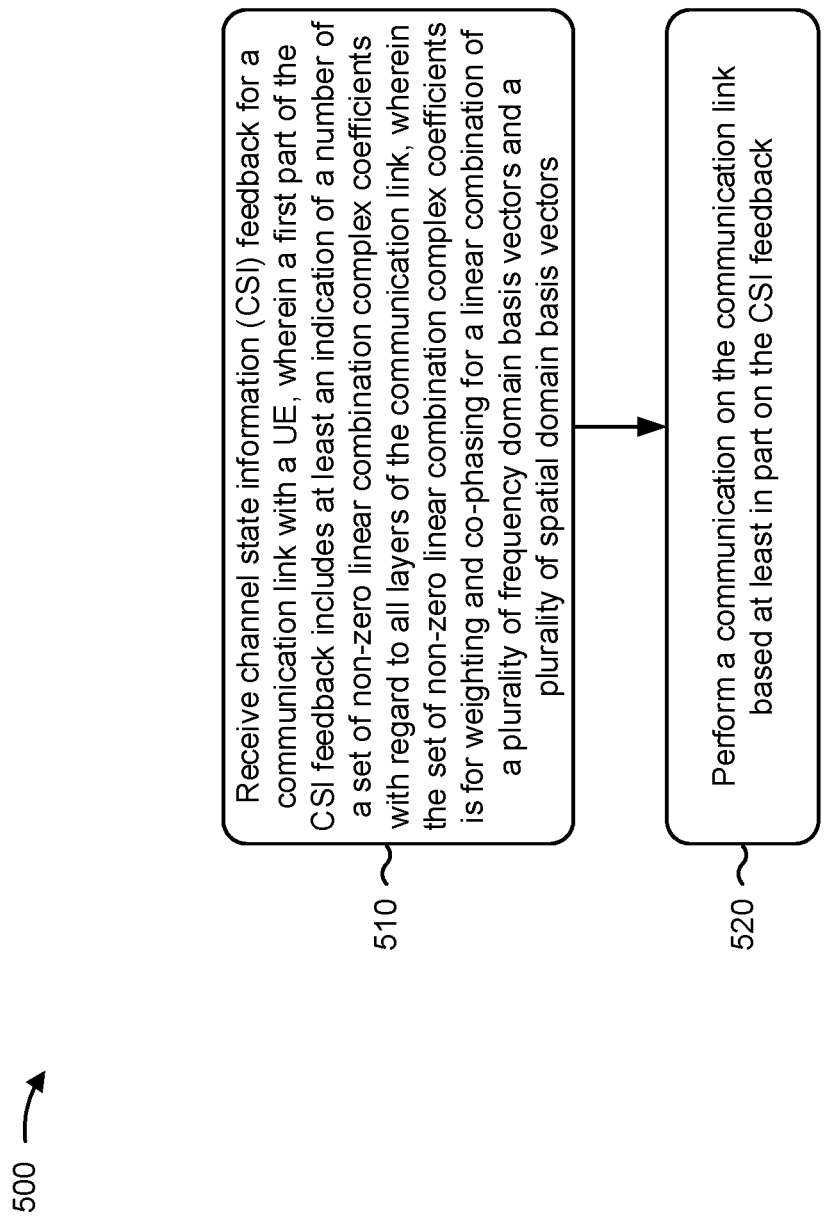
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where a base station (e.g., BS 110) performs CSI feedback identifying at least a number of non-zero FD coefficients across layers of a communication link.

As shown in FIG. 5, in some aspects, process 500 may include receiving channel state information (CSI) feedback for a communication link with a UE, wherein a first part of the CSI feedback includes at least an indication of a number of a set of non-zero linear combination complex coefficients with regard to all layers of the communication link, wherein the set of non-zero linear combination complex coefficients is for weighting and co-phasing for a linear combination of a plurality of frequency domain basis vectors and a plurality of spatial domain basis vectors (block 510). For example, the base station (e.g., using antenna 234, DEMOD 232, MIMO detector 236, receive processor 238, controller/processor 240, and/or the like) may receive CSI feedback for a communication link (e.g., a channel) with a UE. A first part of the CSI feedback may include at least an indication of a number of a set of non-zero linear combination complex coefficients with regard to all layers of the communication link. In some aspects, the set of non-zero linear combination complex coefficients is for weighting and co-phasing for a linear combination of a plurality of frequency domain basis vectors and a plurality of spatial domain basis vectors.

As shown in FIG. 5, in some aspects, process 500 may include performing a communication on a communication link between the UE and the base station based at least in part on the CSI feedback (block 520). For example, the base station (e.g., using controller/processor 240, transmit processor 220, TX MIMO processor 230, MOD 232, antenna 234, and/or the like) may perform a communication on the communication link based at least in part on the CSI feedback.

Process 500 may include additional aspects, such as any single aspect and/or any combination of aspects described below and/or in connection with one or more other processes described elsewhere herein.

In a first aspect, the indication of the number of the set non-zero linear combination complex coefficients has a fixed bitwidth based at least in part on a configured maximum number of layers of the communication link. In a second aspect, alone or in combination with the first aspect, if a number of layers of the CSI feedback is equal to v and is greater than 1, a second part of the CSI feedback indicates how many non-zero linear combination complex coefficients are included in a set of v minus 1 layers of the communication link. In a third aspect, alone or in combination with one or more of the first and second aspects, a second part of the CSI feedback includes an index identifying a selected subset of frequency domain basis vectors from a set of potential frequency domain basis vectors.

In a fourth aspect, alone or in combination with one or more of the first through third aspects, a second part of the CSI feedback includes a first index identifying a particular frequency domain basis vector of a selected subset of frequency domain basis vectors, and a second index identifying remaining frequency domain basis vectors of the selected subset of frequency domain basis vectors.

In a fifth aspect, alone or in combination with one or more of the first through fourth aspects, the remaining frequency domain basis vectors are selected from a subset of a set of potential frequency domain basis vectors, and wherein the subset of the set of potential frequency domain basis vectors are adjacent to the particular frequency domain basis vector. In a sixth aspect, alone or in combination with one or more of the first through fifth aspects, a size of the subset of the set of potential frequency domain basis vectors is based at least in part on a subband size of the CSI feedback. In a seventh aspect, alone or in combination with one or more of the first through sixth aspects, a second part of the CSI feedback identifies positions of the set of non-zero linear combination complex coefficients, or of a set of zero-value linear combination complex coefficients. In an eighth aspect, alone or in combination with one or more of the first through seventh aspects, the positions are identified using a respective bitmap for each layer of the CSI feedback. In a ninth aspect, alone or in combination with one or more of the first through eighth aspects, the positions of the set of non-zero linear combination complex coefficients, or of the set of zero-value linear combination complex coefficients, are identified by individually reporting the position of each frequency domain complex coefficient of the set of non-zero linear combination complex coefficients or the set of zero-value linear combination complex coefficients. In a tenth aspect, alone or in combination with one or more of the first through ninth aspects, the second part of the CSI feedback identifies the positions based at least in part on a payload size of the CSI feedback when identifying positions of the set of non-zero linear combination complex coefficients in comparison to a payload size of the CSI feedback when identifying positions of the set of zero-value linear combination complex coefficients. In an eleventh aspect, alone or in combination with one or more of the first through tenth aspects, the first part of the CSI feedback includes information indicating a number of spatial domain basis vectors, of a set of selected spatial domain basis vectors, that have non-zero linear combination complex coefficients, and the second part of the CSI feedback identifies the positions of the set of non-zero linear combination complex coefficients based at least in part on a bitmap, wherein the bitmap is based at least in part on the number of spatial domain basis vectors that have non-zero linear combination complex coefficients and a number of a set of selected frequency domain basis vectors.

In a twelfth aspect, alone or in combination with one or more of the first through eleventh aspects, the second part of the CSI feedback identifies respective subsets of spatial domain basis vectors, of the number of spatial domain basis vectors that have non-zero linear combination complex coefficients, for each layer of the communication link. In a thirteenth aspect, alone or in combination with one or more of the first through twelfth aspects, a second part of the CSI feedback jointly identifies respective amplitude and phase values of the set of non-zero linear combination complex coefficients for all layers of the communication link.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    performing channel state information (CSI) measurements on one or more reference signal transmissions from a base station;
    determining, based at least in part on the CSI measurements, a set of non-zero linear combination complex coefficients for weighting and co-phasing for a linear combination of a plurality of frequency domain basis vectors and a plurality of spatial domain basis vectors; and
    transmitting a CSI feedback, wherein a first part of the CSI feedback includes at least an indication of a number of the set of non-zero linear combination complex coefficients with regard to all layers of a communication link between the UE and the base station, and wherein a second part of the CSI feedback includes:
        a first index indicative of a particular frequency domain basis vector of a selected subset of frequency domain basis vectors, and
        a second index indicative of remaining frequency domain basis vectors of the selected subset of frequency domain basis vectors.

2. The method of claim 1, wherein the indication of the number of the set of non-zero linear combination complex coefficients has a fixed bitwidth based at least in part on a configured maximum number of layers of the communication link.

3. The method of claim 1, wherein a bitwidth of the indication is independent of a rank indicator of the CSI feedback.

4. The method of claim 1, wherein a second part of the CSI feedback includes an index indicative of a selected subset of frequency domain basis vectors from a set of potential frequency domain basis vectors.

5. The method of claim 4, wherein the index is a combination index with a value between zero and a set of all basis vectors of the frequency domain basis vectors.

6. The method of claim 1, wherein the remaining frequency domain basis vectors are selected from a subset of a set of potential frequency domain basis vectors, and wherein the subset of the set of potential frequency domain basis vectors are adjacent to the particular frequency domain basis vector.

7. The method of claim 6, wherein a size of the subset of the set of potential frequency domain basis vectors is based at least in part on a subband size of the CSI feedback.

8. The method of claim 1, wherein a second part of the CSI feedback identifies positions of the set of non-zero linear combination complex coefficients or of a set of zero-value linear combination complex coefficients.

9. The method of claim 8, wherein the positions are identified using a respective bitmap for each layer of the CSI feedback.

10. The method of claim 1, wherein a second part of the CSI feedback jointly identifies respective amplitude and phase values of the set of non-zero linear combination complex coefficients for all layers of the communication link.

11. A method of wireless communication performed by a base station, comprising:
receiving channel state information (CSI) feedback for a communication link with a user equipment (UE), wherein a first part of the CSI feedback includes at least an indication of a number of a set of non-zero linear combination complex coefficients with regard to all layers of the communication link, wherein a second part of the CSI feedback includes: a first index indicative of a particular frequency domain basis vector of a selected subset of frequency domain basis vectors, and a second index indicative of remaining frequency domain basis vectors of the selected subset of frequency domain basis vectors, and wherein the set of non-zero linear combination complex coefficients are for weighting and co-phasing for a linear combination of a plurality of frequency domain basis vectors and a plurality of spatial domain basis vectors; and
performing a communication on the communication link between the UE and the base station based at least in part on the CSI feedback.

12. The method of claim 11, wherein the indication of the number of the set of non-zero linear combination complex coefficients has a fixed bitwidth based at least in part on a configured maximum number of layers of the communication link.

13. The method of claim 11, wherein a second part of the CSI feedback includes an index indicative of a selected subset of frequency domain basis vectors from a set of potential frequency domain basis vectors.

14. The method of claim 11, wherein the remaining frequency domain basis vectors are selected from a subset of a set of potential frequency domain basis vectors, and wherein the subset of the set of potential frequency domain basis vectors are adjacent to the particular frequency domain basis vector.

15. The method of claim 14, wherein a size of the subset of the set of potential frequency domain basis vectors is based at least in part on a subband size of the CSI feedback.

16. The method of claim 11, wherein a second part of the CSI feedback identifies positions of the set of non-zero linear combination complex coefficients or of a set of zero-value linear combination complex coefficients.

17. The method of claim 16, wherein the positions are identified using a respective bitmap for each layer of the CSI feedback.

18. The method of claim 11, wherein a second part of the CSI feedback jointly identifies respective amplitude and phase values of the set of non-zero linear combination complex coefficients for all layers of the communication link.

19. A user equipment (UE) for wireless communication, comprising:
a memory; and
one or more processors coupled to the memory, the one or more processors configured to:
perform channel state information (CSI) measurements on one or more reference signal transmissions from a base station;
determine, based at least in part on the CSI measurements, a set of non-zero linear combination complex coefficients for weighting and co-phasing for a linear combination of a plurality of frequency domain basis vectors and a plurality of spatial domain basis vectors; and
transmit a CSI feedback, wherein a first part of the CSI feedback includes at least an indication of a number of the set of non-zero linear combination complex coefficients with regard to all layers of a communication link between the UE and the base station and wherein a second part of the CSI feedback includes:
a first index indicative of a particular frequency domain basis vector of a selected subset of frequency domain basis vectors, and
a second index indicative of remaining frequency domain basis vectors of the selected subset of frequency domain basis vectors.

20. The UE of claim 19, wherein the indication of the number of the set of non-zero linear combination complex coefficients has a fixed bitwidth based at least in part on a configured maximum number of layers of the communication link.

21. The UE of claim 19, wherein a bitwidth of the indication is independent of a rank indicator of the CSI feedback.

22. The UE of claim 19, wherein a second part of the CSI feedback includes an index indicative of a selected subset of frequency domain basis vectors from a set of potential frequency domain basis vectors.

23. The UE of claim 22, wherein the index is a combination index with a value between zero and a set of all basis vectors of the frequency domain basis vectors.

24. A user equipment (UE) for wireless communication, comprising:
a memory; and
one or more processors coupled to the memory, the one or more processors configured to:
perform channel state information (CSI) measurements on one or more reference signal transmissions from a base station;
determine, based at least in part on the CSI measurements, a set of non-zero linear combination complex coefficients for weighting and co-phasing for a linear combination of a plurality of frequency domain basis vectors and a plurality of spatial domain basis vectors; and
transmit a CSI feedback, wherein a first part of the CSI feedback includes at least an indication of a number of the set of non-zero linear combination complex coefficients with regard to all layers of a communication link between the UE and the base station, wherein a second part of the CSI feedback identifies positions of the set of non-zero linear combination complex coefficients or of a set of zero-value linear combination complex coefficients, and wherein the positions are identified using a respective bitmap for each layer of the CSI feedback.

25. A user equipment (UE) for wireless communication, comprising:
   a memory; and
   one or more processors coupled to the memory, the one or more processors configured to:
      perform channel state information (CSI) measurements on one or more reference signal transmissions from a base station;
      determine, based at least in part on the CSI measurements, a set of non-zero linear combination complex coefficients for weighting and co-phasing for a linear combination of a plurality of frequency domain basis vectors and a plurality of spatial domain basis vectors; and
      transmit a CSI feedback, wherein a first part of the CSI feedback includes at least an indication of a number of the set of non-zero linear combination complex coefficients with regard to all layers of a communication link between the UE and the base station, and wherein a second part of the CSI feedback includes a first index indicative a particular frequency domain basis vector of a selected subset of frequency domain basis vectors.

26. The UE of claim 25, wherein the second part of the CSI feedback includes a second index indicative of remaining frequency domain basis vectors of the selected subset of frequency domain basis vectors.

27. A user equipment (UE) for wireless communication, comprising:
   a memory; and
   one or more processors coupled to the memory, the one or more processors configured to:
      perform channel state information (CSI) measurements on one or more reference signal transmissions from a base station;
      determine, based at least in part on the CSI measurements, a set of non-zero linear combination complex coefficients for weighting and co-phasing for a linear combination of a plurality of frequency domain basis vectors and a plurality of spatial domain basis vectors; and
      transmit a CSI feedback, wherein a first part of the CSI feedback includes at least an indication of a number of the set of non-zero linear combination complex coefficients with regard to all layers of a communication link between the UE and the base station, wherein a second part of the CSI feedback identifies positions of the set of non-zero linear combination complex coefficients or of a set of zero-value linear combination complex coefficients, and wherein the positions are associated with a respective bitmap for each layer of the CSI feedback.

* * * * *

UNITED STATES PATENT AND TRADEMARK OFFICE
CERTIFICATE OF CORRECTION

PATENT NO. : 12,047,989 B2
APPLICATION NO. : 17/309580
DATED : July 23, 2024
INVENTOR(S) : Chao Wei et al.

It is certified that error appears in the above-identified patent and that said Letters Patent is hereby corrected as shown below:

In the Claims

In Claim 4, Column 20, Line 66, "wherein a second part" should be changed to -- "wherein the second part" --;

In Claim 4, Column 20, Line 67, "indicative of a selected" should be changed to -- "indicative of the selected" --;

In Claim 8, Column 21, Line 15, "wherein a second part" should be changed to -- "wherein the second part" --;

In Claim 10, Column 21, Line 22, "wherein a second part" should be changed to -- "wherein the second part" --;

In Claim 13, Column 21, Line 53, "wherein a second part" should be changed to -- "wherein the second part" --;

In Claim 13, Column 21, Line 54, "indicative of a selected" should be changed to -- "indicative of the selected" --;

In Claim 16, Column 21, Line 66, "wherein a second part" should be changed to -- "wherein the second part" --;

In Claim 18, Column 22, Line 6, "wherein a second part" should be changed to -- "wherein the second part" --;

In Claim 22, Column 22, Line 45, "wherein a second part" should be changed to -- "wherein the second part" --;

Signed and Sealed this
Fifth Day of November, 2024

Katherine Kelly Vidal
*Director of the United States Patent and Trademark Office*

In Claim 22, Column 22, Line 46, "indicative of a selected" should be changed to -- "indicative of the selected" --.